(12) United States Patent
Visser

(10) Patent No.: US 8,438,187 B2
(45) Date of Patent: May 7, 2013

(54) SYSTEM AND METHOD FOR DYNAMIC DISPLAY OF SUMMATIONS IN COLLAPSIBLE HIERARCHICAL TABLES

(75) Inventor: Pepijn Visser, Lobbach (DE)

(73) Assignee: SAP AG, Walldorf (DE)

( * ) Notice: Subject to any disclaimer, the term of this patent is extended or adjusted under 35 U.S.C. 154(b) by 120 days.

(21) Appl. No.: 12/976,335

(22) Filed: Dec. 22, 2010

(65) Prior Publication Data

US 2012/0166486 A1    Jun. 28, 2012

(51) Int. Cl.
*G06F 17/30*    (2006.01)

(52) U.S. Cl.
USPC .................................. 707/792; 707/E17.049

(58) Field of Classification Search ........................ None
See application file for complete search history.

(56) References Cited

U.S. PATENT DOCUMENTS

2007/0185987 A1*    8/2007    Dieberger et al. ............ 709/224

* cited by examiner

*Primary Examiner* — Anteneh Girma
(74) *Attorney, Agent, or Firm* — Kenyon & Kenyon LLP

(57) ABSTRACT

The system, method and machine-readable medium that provides an efficient presentation of a hierarchical table by providing an accurate summation of table line values when the table is expanded and collapsed.

12 Claims, 6 Drawing Sheets

100

200

400

500

600

US 8,438,187 B2

SYSTEM AND METHOD FOR DYNAMIC DISPLAY OF SUMMATIONS IN COLLAPSIBLE HIERARCHICAL TABLES

BACKGROUND

Disclosed is a system for a dynamic display of a summation in a collapsible hierarchical table. In particular, the present application describes a tool for maintaining a proper summation as a hierarchical table is expanded from a general view to a more detailed view and vice versa.

Hierarchical tables that display items at different levels of granularity are frequently used in software design. They are a quick and efficient means to compare a list of items with the same features. Typically, a line in the table shows the item together with a set of numeric and/or alphanumeric features of the item. Numeric features are often summed, such as in the table of FIG. 1. In more detail, FIG. 1 illustrates an exemplary collapsed hierarchical table. The exemplary hierarchical table 100 displays a company structure with nodes 110 and 120. Node 110 represents a division within the company called "My Company—Germany", while node 120 represents another division within the company called "My Company—U.S." Elements 115 and 125 are assigned to respective nodes 110 and 120, and each value represents a total number of employees at the respective division within the company. Node 150, called "Total", is assigned a value 155 that is a sum total of all the values in the table, i.e., 115 and 125. For example, the "My Company—Germany" (node 110) division of the company structure has "50" (element 115) employees, while "My Company—U.S." (node 120) division of the company structure also has "50" (element 125) employees. The "Total" (150) number of employees being the sum of "50" (element 115) and "50" (element 125), which is "100" (element 155) employees. Each node 110, 120 and subnodes (not shown) have an collapsed/expanded icon adjacent to the node name. In FIG. 1, the nodes 110, 120 are shown collapsed, so the icon 112 is shown as an up arrow (↑). Although the illustrated example is presented in terms of a company structure and a number of employees, any other list of items and an assigned value that includes a totaling operation may be used. The subject matter of the example should not be considered limiting.

In the display of sums in collapsible hierarchical tables as in FIG. 2A, a problem occurs when amounts are listed (in the illustrated example: "Employees") both on abstract and more detailed levels, then the summation is no longer correct. For example, the table 100 is shown with node 110 expanded, and the icon 112 is replaced with expanded icon 113, which here is shown as a rightwards arrow (→). The expansion of node 110 reveals subnodes 230 "My Company—Heidelberg" and 240 ("My Company—Berlin"). Node 230 has the expanded icon 113 adjacent to it which indicates that it is also expanded to reveal subnodes 231 ("My Company—Heidelberg Centrum") and 233 ("My Company—Heidelberg Area"). In the example of FIG. 2A, all of the elements 115, 235, 237, 239 245 and 125 that are respectively assigned to each of odes 110, 120 and subnodes 230, 231 and 233 are also shown. That is, the values "50" (element 115), "25" (element 235), "15" (element 237), "10" (element 239), "25" (element 245) and "50" (element 125) in each table line are still correct but the vertical summation (element 155) over all lines in the table will display amounts that are double the actual count (i.e., 100), or worse. The user summation of total employees 155 based on simply visualization (e.g., quick glance at the individual values) is incorrect, which is confusing for the end users. Hence, the table has lost one of its' attractive features. Since end users frequently do high-level checks by visualization on such summations to confirm the correctness, but now the total value 155 clearly does not correspond to the values 115, 235, 237, 239, 245, and 125 presented.

This problem also occurs, for instance, in commonly used desktop programs such as Excel™. To correctly display the summation of the amount column one can for instance decide to list the sums at the most detailed level only, i.e., the most abstract level. In FIG. 2B, the sum of the displayed values (elements 115 and 125) equals the displayed total (element 155) but the user does not have any information on the values corresponding to the lower abstraction levels, i.e., the subnode "My Company—Heidelberg" and further subnodes "My Company—Heidelberg Centrum", "My Company—Heidelberg Area", or subnode "My Company—Berlin." This information is usually available, and required by end users. Hence, the solution illustrated in FIG. 2B is not often favored.

In the alternative shown in FIG. 2C, the user has the advantage of having the most detailed amounts visible in the table. For example, the lowest subnodes (231, 233) in the hierarchical table 100 are displayed. However, the sum of the displayed amounts (237, 239), again does not match the total amount (155). As shown, the values of elements 237 and 239 only total "25", but the total amount 155 in the Total 150 line is shown as the value "100". This view of table 200 is disfavored as the user is not presented with an accurate view of the total at the selected level of abstraction. A final alternative is to add additional columns to the table 200 reflecting the amounts by abstraction level, or subnodes. This approach also uses a large amount of display device real estate, and, hence, is also not popular.

Accordingly, the inventor recognizing the need for and benefits of accurately depicting summation values in a hierarchical table, and developed a solution that provides the user with an accurate summation at all levels of abstraction.

DETAILED DESCRIPTION

Embodiments also provide for a system, method and machine readable medium for implementing the method. The method may include a memory that may store at the lowest subnode of a node in the collapsible hierarchical table, a sub-value of the node. Under control of a processor, the collapsible hierarchical table in the table's most collapsed form with a displayed sum of the node in a table and a value corresponding to each individual node presented in the table may be displayed on a display device. The sum of each individual node value may be the sum of the table nodes. In response to an input expanding a node of the table, the value related to the node may be removed from the presented table. The subnodes and corresponding sub-values related to the subnodes may be presented on the display device.

Figure 1:
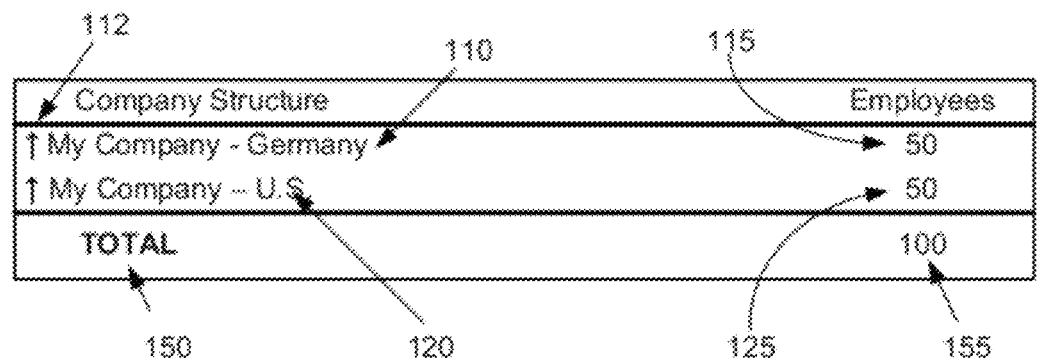
FIG. 1 illustrates a hierarchical table structure including the presentation of numerical values.
Figure 2A:
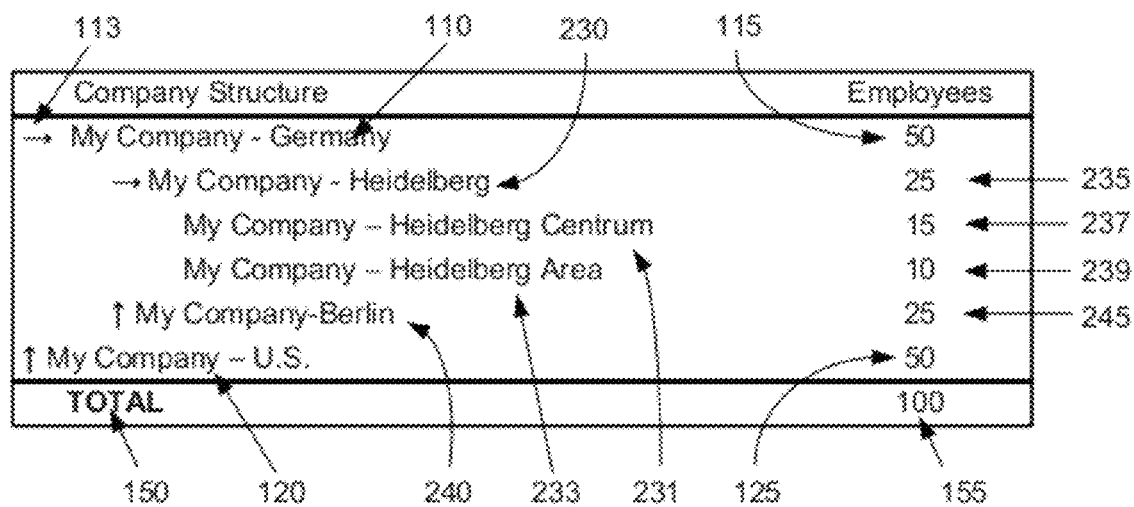
FIGS. 2A-2C illustrate the problems of current presentations of numerical values in a hierarchical table structure.
Figure 2B:
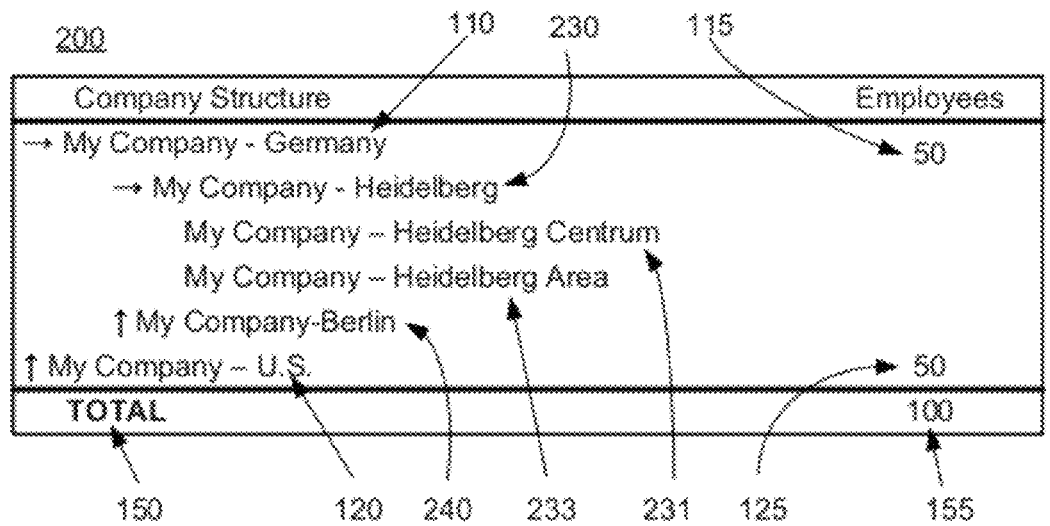
Figure 2C:
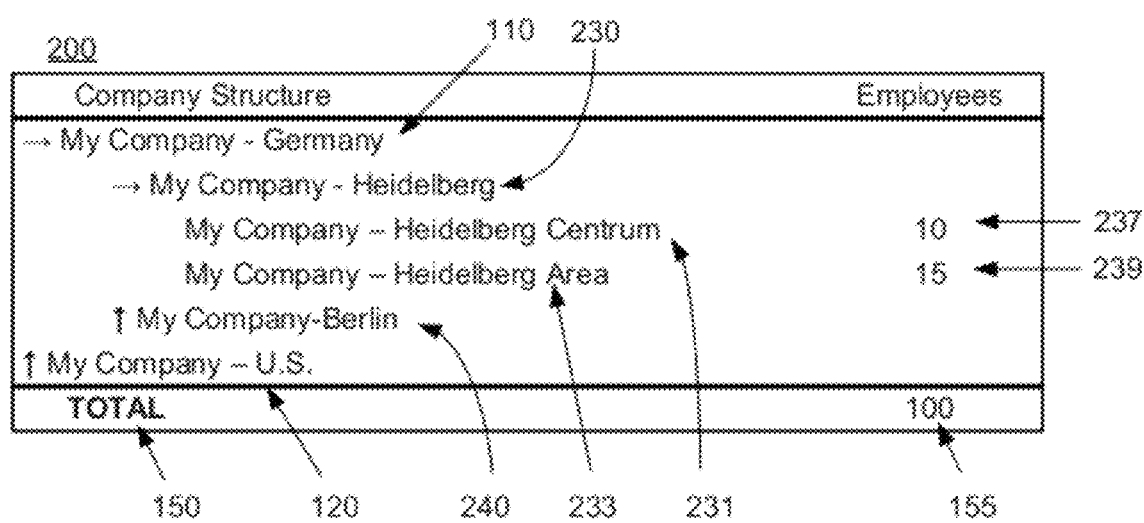
Figure 3:
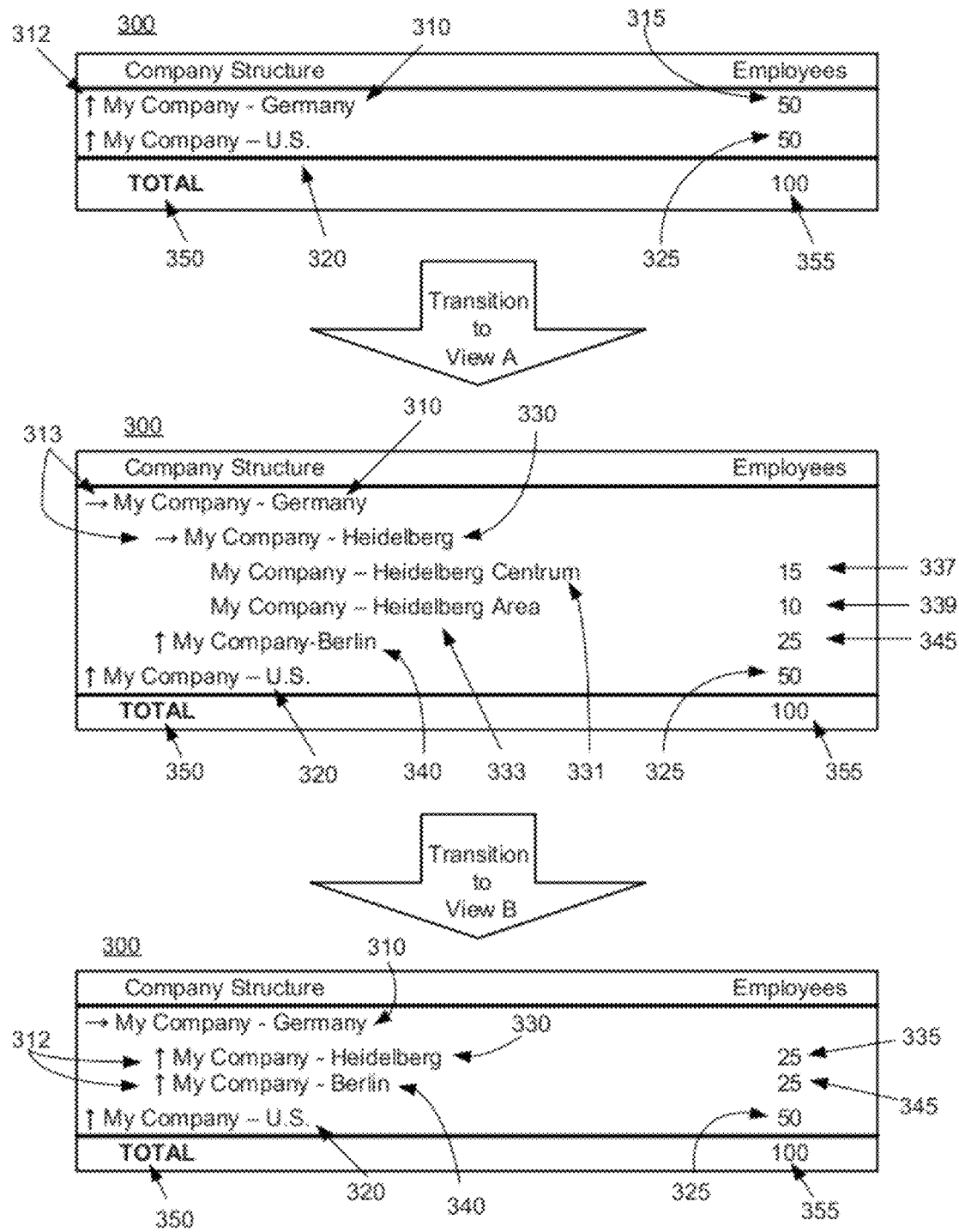
FIG. 3 illustrates an exemplary transition through a hierarchical data structure containing expandable data fields according to an embodiment of the present invention.

FIG. 3 illustrates an exemplary transition through a hierarchical data structure containing expandable data fields according to an embodiment of the present invention. The data table 300 may include nodes 310 and 320 that have respective table values 315 and 325. The data structure 300 also may have a total line that includes the "Total" heading 350 and the total value 355. In the present example, the data table 300 may present the number of employees in a company. In this case, the company has two divisions: "My Company—Germany" and "My Company—U.S.", which both have fifty (50) employees. Therefore, the total number of employees in the company is "100" as shown in the total value 355. The data table 300 has an icon 312 that indicates that the node 310 (and node 320) may be expanded.

Upon selection of the icon 312 to expand node 310, the data table 300 transitions to present a view (View A) of data table 300. View A presents the data structure 300 with node 310 expanded to show subnodes 330 and 340, which, for example, represent company subdivisions. The subnode 330 labeled as subdivision "My Company—Heidelberg" also has subnodes 331 and 333 beneath it in the hierarchy, which are labeled "My Company—Heidelberg Centrum" and "My Company—Heidelberg Area", respectively. In addition, subnode 340 labeled "My Company—Berlin" is also shown. Each subnode, 331, 333 and 340 have corresponding values shown as elements 337, 339 and 345, respectively. As shown in View A, the elements 315 is removed from the presentation of the data table 300 when the node 330 is expanded. The elements 337 and 339 and 345, which have the respective values "15", "10" and "25" replace the number of employees (i.e., the value "50") for subnode 330. Accordingly, under view A, the summation of the values ("15"+"10"+"25"+"50") matches the total value (element 355) of "100" total employees. Note that since subnode 330 is expanded a total value is not presented in the table in the same table line as the "My Company—Heidelberg" node label.

As the node 330 is collapsed by selection of icon 313, the subnodes 331 and 333 are removed and the total employee value (i.e. "25") corresponding to subdivision "My Company—Heidelberg" may replace the values ("10" and "15") presented with subnodes 331 and 333. The subnode 330 now may have the sum total of elements 337 and 339 in the table line with it. As view B illustrates, node 310 may be expanded to reveal subnodes 330 and 340. Each of subnode 330 and 340 has a corresponding element 335 and 345 that indicates a value. In this case, the values are "25" and "25", which when summed and added to the value ("50") for the subdivision "My Company—U.S." at node 320, may total to "100." The total 350 with element 355 may still present a value ("100") that is equal to the values ("25", "25" and "50") shown above it in the data table 300. Advantageously, the presented views shown in FIG. 3 may allow a user to make the mental summation to confirm the total by presenting only the relevant values.

A process 400 for applying the functions of the described system will be made with reference to FIG. 3 above. At step 410, a processor may maintain a hierarchical table with values stored at a lower subnode. For example, with reference to FIG. 3, elements 337 and 339 are the lowest subnodes that are shown. The values ("15" and "10") may be stored in a data structure representing the table 300 shown. Of course, other subnodes may be used. In step 420, the table may be presented collapsed to the highest node that shows a summation of values from subnodes at the highest node. In an example from FIG. 3, in view B, the subdivision "My Company—Heidelberg" is shown with a value 25, which is a summation of the values "10" and "15" from the subdivisions "My Company—Heidelberg Centrum" and "My Company—Heidelberg Area" that are lowest subnodes (331, 333) below subnode 330. In response to a request to expand a node of the table to view subnodes, values may be determined for display at the subnode indicated by the requested expansion (step 430). In other words, a value is determined for the subnode to be indicated. Returning to an example as illustrated in View A of FIG. 3, the node 330 is requested for expansion by selection of icon 312, and subnodes 331, 333 and related elements 337 and 339 are retrieved, or, determined, if subnodes 331 and 333 are not the lowest subnodes. The new table to be displayed may be generated by a processor at step 440, and, at step 450, the generated table may be presented on a display device with the summation of values that correspond to the highest node removed and the retrieved (or determined) subvalues that correspond to the subnode at the requested level of expansion. Similarly, at step 460, in response to a request to collapse the table to view higher nodes, or subnodes, a table may be generated for display by a processor in which the subnodes may be removed from the table, and values may be determined (or retrieved) for the node, or subnode, indicated by the requested collapse (See View B of FIG. 3). The generated table may be presented with the determined (or retrieved) subvalue(s) displayed at the subnode(s) of the requested level of collapse.

An algorithm for implementing the above process may use the following pseudo code modules. Presume that a global table structure with summations that may be maintained at the lowest levels while values at higher levels of the hierarchy may be determined dynamically.

```
/* Algorithm assumes global table (node) structure with sums maintained at lowest level ("leaves") only */
/* Values at higher abstraction levels are determined dynamically */
/* "TopLevelNode", "NodeDirectlyBelow" and "SelectedNode" are node pointers */
/* "Amounts" is a data structure containing a "sum" field for a single row in the table */
/* First time Table is shown one level is expanded */
Function FirstDraw (input: TopLevelNode)
   UserExpands (input: TopLevelNode)
Function DetermineAmounts (input: Node; output: AmountsOut)
   For each NodeDirectlyBelow (input: Node)
      DetermineAmounts (input: NodeDirectlyBelow; output: SubAmounts)
      AddAmounts (input: SubAmounts, AmountsOut; output: AmountsOut)
   EndFor
Function UserExpands (input: SelectedNode)
   DisplayNodeWithoutAmounts (input: SelectedNode)
   For each NodeDirectlyBelow (input: SelectedNode)
      DetermineAmounts (input: NodeDirectlyBelow; output: Amounts)
```

```
    DisplayNodeWithAmounts (input: NodeDirectlyBelow, Amounts)
  EndFor
Function UserCollapses (input: SelectedNode)
  RemoveNodesBelow (input: SelectedNode)
  DetermineAmounts (input: SelectedNode; output: Amounts)
  DisplayNodeWithAmounts (input: SelectedNode, Amounts)
```

The algorithm can be optimized by storing the (determined) sums at all levels in the hierarchy and keeping them up to date after changes. The efficiency may be dependent upon the frequency of changes in the amounts and the structure of the hierarchy (e.g., its depth). Of course, variations of the above algorithm or other algorithms may be used to achieve the same result.

Figure 5:
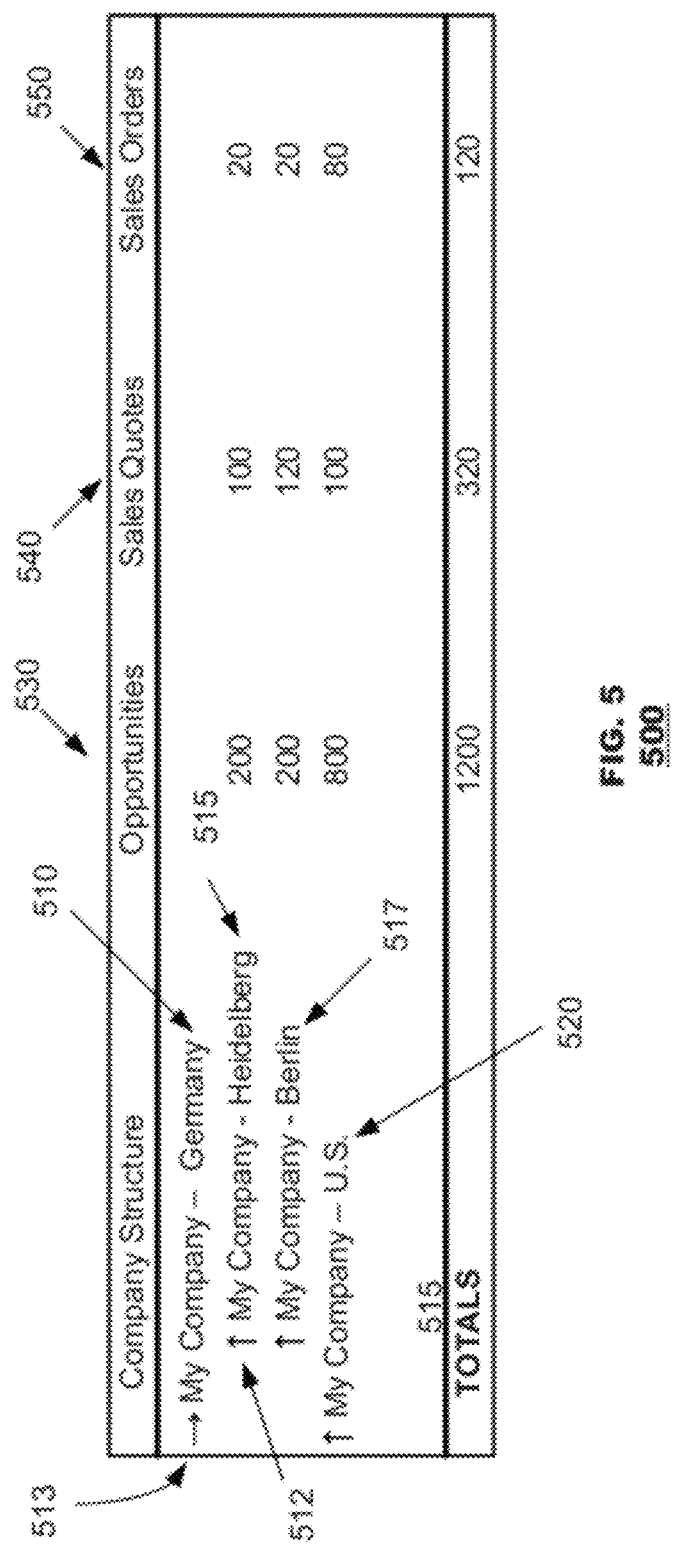
FIG. 5 illustrates a multiple column, hierarchical data structure containing expandable data fields according to an embodiment of the present invention.

FIG. 5 illustrates a multiple column, hierarchical data table containing expandable data fields according to an embodiment of the present invention. The table 500 may include in nodes 510 and 520, and sub nodes 515 and 517 and additional columns 530, 540 and 550. The additional columns 530, 540 and 550 may also be summed as discussed above with respect to FIG. 3 as the table is expanded and collapsed using the icons 512 and 513.

Figure 6:
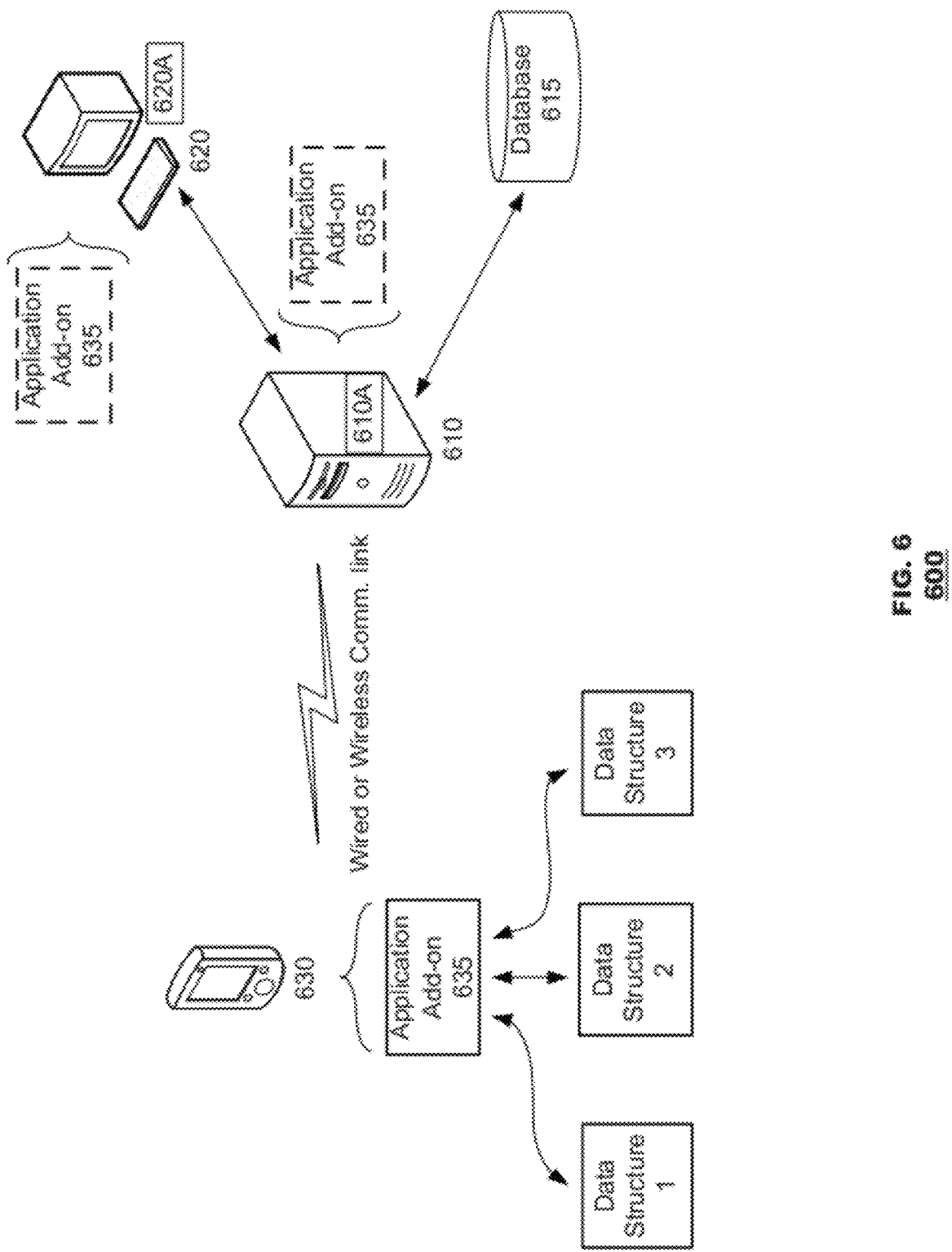
FIG. 6 illustrates an exemplary hardware configuration for implementing the exemplary process according to an embodiment of the present invention.

FIG. 6 illustrates an exemplary hardware configuration for implementing a system according to an embodiment of the present invention. The system 600 may comprise one or more networked servers 610, one or more client terminals 620, data storage devices 615, wired and wireless communication links, and a portable device(s) 630. The one or more networked servers 610 may execute a multi-application software system. The servers 610 may include processor(s) 610A, internal memory and related computer program instructions (not shown).

The server 610 may execute on a processor a communication manager program that facilitates communication including data transfers between the networked servers 610 and the portable device(s) 630 over wired or wireless communication paths. The communications manager within the server 610 may facilitate communication between the portable device 630. The server 610 may access data storage device(s) 615 that store machine-readable software instructions that may be accessed and executed by the processor(s) 610A of the server 610.

The data storage device(s) 615 also may store data generated by the application 635 on a data storage device 615 that may be a hard disk drive, non-volatile memory, flash memory, or any suitable device for storing electronic data. Persistent data may be maintained in the data storage device 615 that is at the back-end of the computer system. The data storage may maintain hierarchical data structures containing information related to a variety of different business functions of an enterprise. For example, in a human resources environment, department staffing including headcount, projected growth, and attrition, employee profiles and salary information, key positions and employee performance, and the like may be maintained. Or, in an accounting environment, invoicing, accounts due, accounts payable, projected revenue and the like may be maintained.

Figure 4:
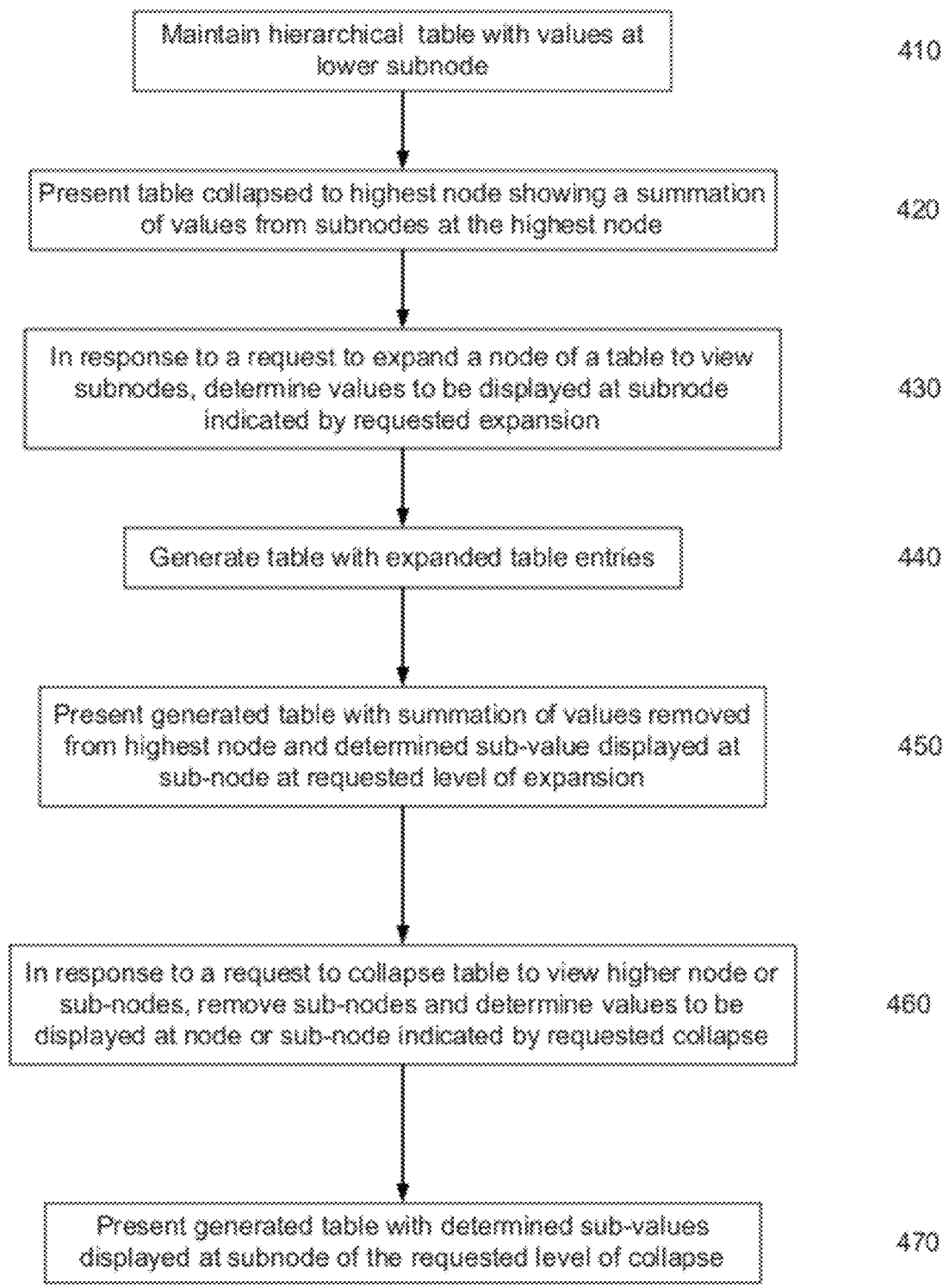
FIG. 4 illustrates an exemplary process according to an embodiment of the present invention.

The servers 610 may communicate with client terminal(s) 620 and portable device(s) 630 via network connections and the like. The client terminals 620 may include a processor 620A, display device, and data storage device (not shown), such as a hard disk. The client terminals 620 may participate in execution of program instructions representing the application add-on 635. The portable device 630 may be a smartphone, personal digital assistant, tablet, notebook or mini-notebook computer capable of wired and/or wireless communication. The portable device 630 may include memory, a processor, input device, display, and devices that enable wired or wireless communication. An application 635 executing on the portable device 630 may generate data structures 1, 2 and 3 using data from data records stored on the data storage device 615 or that are input to the portable device 630 by a user. The application add-on 635 may also be network based and executable by the server 610 or client terminals 620. The application add-on 635 may include computer program instructions for providing the display of the data structures as described with respect to FIGS. 3-5 on a display device.

The number of servers, number of clients and topology of the network connections between them are immaterial to the present discussion unless otherwise noted. For example, in a human resources environment, department staffing including headcount, projected growth, and attrition, employee profiles and salary information, key positions and employee performance, and the like may be maintained. Or, in an accounting environment, invoicing, accounts due, accounts payable, projected revenue and the like may be maintained.

The exemplary method and computer program instructions may be embodied on a machine readable storage medium such as a computer disc, optically-readable media, magnetic media, hard drives, RAID storage device, and flash memory. In addition, a server or a database server may include machine readable media configured to store machine executable program instructions. The features of the disclosed embodiments may be implemented in hardware, software, firmware, or a combination thereof and utilized in systems, subsystems, components or subcomponents thereof. When implemented in software, the elements of the disclosed embodiments are programs or the code segments used to perform the necessary tasks. The program or code segments can be stored on machine readable storage media. The "machine readable storage media" may include any medium that can store information. Examples of a machine readable storage medium include electronic circuits, semiconductor memory device, ROM, flash memory, erasable ROM (EROM), floppy diskette, CD-ROM, optical disk, hard disk, fiber optic medium, or any electromagnetic or optical storage device. The code segments may be downloaded via computer networks such as Internet, Intranet, etc.

Although the invention has been described above with reference to specific embodiments, the invention is not limited to the above embodiments and the specific configurations shown in the drawings. For example, some components shown may be combined with each other as one embodiment, or a component may be divided into several subcomponents, or any other known or available component may be added. The operation processes are also not limited to those shown in the examples. Those skilled in the art will appreciate that the invention may be implemented in other ways without departing from the spirit and substantive features of the invention. For example, features and embodiments described above may be combined with and without each other. The present embodiments are therefore to be considered in all respects as illustrative and not restrictive. The scope of the invention is indicated by the appended claims rather than by the foregoing description, and all changes that come within the meaning and range of equivalency of the claims are therefore intended to be embraced therein.

What is claimed is:

1. A method for removing summation of numeric values presented in expanded lines of a collapsible hierarchical tables, comprising:

storing, in memory, at a lower subnode of a node in the collapsible hierarchical table, a numeric sub-value of the node;

presenting, on a display device under the control of a processor, the collapsible hierarchical table in the table's most collapsed form with a displayed sum of the node in a table row and a numeric value corresponding to each individual node presented in the table, wherein the sum of each individual node numeric value is the summation of the table nodes;

in response to a user input expanding a node of the table, removing from the presented table the numeric value related to the node, wherein removing the numeric value related to the node allows a user to make a mental summation to confirm the sum by providing an accurate summation of table line value when the table is expanded; and presenting subnodes indicated by the requested expansion and corresponding numeric sub-values related to the subnodes, wherein the sum of each numeric value presented in the presented table and the numeric sub-values presented in the table matches the said summation of the table nodes.

2. The method of claim 1, comprising:

in response to an input requesting collapse of a subnode of the table, removing the subnode from the presented table;

determining a numeric value of the higher level node indicated by the collapse request; and presenting higher level nodes and corresponding numeric values related to the higher level nodes.

3. The method of claim 2, wherein the determining comprises summing the numeric subvalues of the subnode to provide a numeric value for the node.

4. A non-transitory machine-readable medium embodied with program instructions for causing a processor to execute a method for removing summation of numeric values presented in expanded lines of a collapsible hierarchical tables, comprising:

storing, in memory, at a lower subnode of a node in the collapsible hierarchical table, a numeric sub-value of the node;

presenting, on a display device under the control of a processor, the collapsible hierarchical table in the table's most collapsed form with a displayed sum of the node in a table and a numeric value corresponding to each individual node presented in the table, wherein the sum of each individual node numeric value is the sum of the table nodes;

in response to an input expanding a node of the table, removing from the presented table the numeric value related to the node, wherein removing the numeric value related to the node allows a user to make a mental summation to confirm the sum by providing an accurate summation of table line values when the table is expanded; and presenting subnodes indicated by the requested expansion and corresponding numeric sub-values related to the subnodes, wherein the sum of each numeric value presented in the table and the numeric sub-values presented in the table matches the said sum of the table nodes.

5. The non-transitory machine-readable medium of claim 4, comprising:

in response to an input requesting collapse of a subnode of the table, removing the subnode from the presented table;

determining a numeric value of the higher level node indicated by the collapse request; and presenting higher level nodes and corresponding numeric values related to the higher level nodes.

6. The non-transitory machine-readable medium method of claim 5, wherein the determining comprises summing the numeric subvalues of the subnode to provide a numeric value for the node.

7. A system for removing summation of numeric values presented in expanded lines of a collapsible hierarchical tables, comprising:

a server for providing network services and access to data;
a data storage device for storing data; and
a processor configured to:

store, in memory, at a lower subnode of a node in the collapsible hierarchical table, a numeric sub-value of the node;

present, on a display device under the control of a processor, the collapsible hierarchical table in the table's most collapsed form with a displayed sum of the node in a table and a numeric value corresponding to each individual node presented in the table, wherein the sum of each individual node numeric value is the sum of the table nodes;

in response to an input expanding a node of the table, remove from the presented table the numeric value related to the node, wherein removing the numeric value related to the node allows a user to make a mental summation to confirm the sum by providing an accurate summation of table line values when the table is expanded; and present subnodes indicated by the requested expansion and corresponding numeric sub-values related to the subnodes, wherein the sum of each numeric value presented in the table and the numeric sub-values presented in the table matches the said sum of the table nodes.

8. The system of claim 7, wherein the processor is further configured to:

in response to an input requesting collapse of a subnode of the table, remove the subnode from the presented table;
determine a numeric value of the higher level node indicated by the collapse request; and
present higher level nodes and corresponding numeric values related to the higher level nodes.

9. The system of claim 8, wherein the processor is further configured to:

sum the numeric subvalues of the subnode to provide a numeric value for the node when determining a value.

10. The system of claim 7, wherein the processor is located in portable device.

11. The system of claim 10, wherein the portable device is a smartphone.

12. The system of claim 7, wherein the processor is located in a client device.

* * * * *